(12) United States Patent
Kim et al.

(10) Patent No.: US 12,468,416 B2
(45) Date of Patent: Nov. 11, 2025

(54) SENSOR LAYER AND ELECTRONIC APPARATUS INCLUDING THE SAME

(71) Applicant: Samsung Display Co., LTD., Yongin-si (KR)

(72) Inventors: Kicheol Kim, Yongin-si (KR); Eunyoung Kim, Yongin-si (KR); Wonjun Choi, Yongin-si (KR); Hyeyun Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/603,106

(22) Filed: Mar. 12, 2024

(65) Prior Publication Data

US 2024/0310943 A1 Sep. 19, 2024

(30) Foreign Application Priority Data

Mar. 15, 2023 (KR) .......................... 10-2023-0033953

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0446* (2019.05); *G06F 3/0445* (2019.05); *G06F 2203/04112* (2013.01)

(58) Field of Classification Search
None
See application file for complete search history.

(56) References Cited

U.S. PATENT DOCUMENTS

| | | | |
|---|---|---|---|
| 9,851,855 B2 | 12/2017 | Bok | |
| 11,402,935 B2 | 8/2022 | Lee | |
| 11,662,864 B2 | 5/2023 | Seo et al. | |
| 2019/0051708 A1* | 2/2019 | Jeong | H10K 59/1213 |
| 2020/0089350 A1* | 3/2020 | Han | G06F 3/0448 |
| 2020/0089355 A1* | 3/2020 | Moon | G06F 3/0412 |
| 2020/0264719 A1* | 8/2020 | You | G06F 3/0446 |
| 2020/0293150 A1 | 9/2020 | Jeong | |
| 2022/0004282 A1* | 1/2022 | Lee | G06F 3/0448 |

(Continued)

FOREIGN PATENT DOCUMENTS

| | | |
|---|---|---|
| KR | 10-2021-0056468 A | 5/2021 |
| KR | 10-2022-0091237 A | 6/2022 |
| KR | 10-2445687 B1 | 9/2022 |

*Primary Examiner* — Parul H Gupta
(74) *Attorney, Agent, or Firm* — Womble Bond Dickinson (US) LLP

(57) ABSTRACT

An electronic apparatus includes: a display layer configured to display images; and a sensor layer on the display layer and comprising a sensing region and a non-sensing region; wherein the sensor layer includes: first sensing electrodes extending on the sensing region in a first direction and arranged in a second direction crossing the first direction; second sensing electrodes extending on the sensing region in the second direction and arranged in the first direction; and first sensing signal lines connected to the first sensing electrodes, respectively, through a contact part overlapping the sensing region, wherein a length of each of the first sensing electrodes in the first direction is greater than a length of each of the second sensing electrodes in the second direction, and the first sensing electrodes have a same length in the sensing region.

18 Claims, 9 Drawing Sheets

(56) References Cited

U.S. PATENT DOCUMENTS

2022/0197441 A1   6/2022  Choi et al.
2022/0197474 A1   6/2022  Kang et al.
2024/0241596 A1*  7/2024  Choi ..................... G06F 3/0444
2025/0190081 A1*  6/2025  Lee ...................... G06F 3/0412

* cited by examiner

SENSOR LAYER AND ELECTRONIC APPARATUS INCLUDING THE SAME

CROSS-REFERENCE TO RELATED APPLICATION

The present application claims priority to and the benefit of Korean Patent Application No. 10-2023-0033953, filed on Mar. 15, 2023, in the Korean Intellectual Property Office, the entire content of which is incorporated herein by reference.

BACKGROUND

1. Field

Aspects of some embodiments of the present disclosure herein relate to an electronic apparatus including a sensor layer.

2. Description of Related Art

Multimedia apparatuses such as televisions, mobile phones, tablet computers, navigation units, and game consoles, may display images to users through a display screen and may provide touch-based input schemes, which enable users to input information or commands relatively intuitively and conveniently.

The above information disclosed in this Background section is only for enhancement of understanding of the background and therefore the information discussed in this Background section does not necessarily constitute prior art.

SUMMARY

The present disclosure provides a sensor layer with improved reliability and an electronic apparatus including the sensor layer.

According to some embodiments of the present disclosure an electronic apparatus includes a display layer that displays images, and a sensor layer on the display layer and includes a sensing region and a non-sensing region. According to some embodiments, the sensor layer includes first sensing electrodes, which extend on the sensing region in a first direction and are arranged in a second direction crossing the first direction, second sensing electrodes, which extend on the sensing region in the second direction and are arranged in the first direction, and first sensing signal lines which are connected to the first sensing electrodes, respectively, through a contact part overlapping the sensing region. According to some embodiments, a length of each of the first sensing electrodes in the first direction may be greater than a length of each of the second sensing electrodes in the second direction, and the first sensing electrodes may have the same length on the sensing region.

According to some embodiments, the first sensing signal lines may extend in the second direction and be arranged in the first direction within the sensing region.

According to some embodiments, the sensing region may have a length in the first direction, which is greater than a length in the second direction.

According to some embodiments, the sensing region may include first to third sensing regions arranged in the first direction, and each of the first sensing electrodes may include first to third split electrodes that are in the first to third sensing regions, respectively. The first to third split electrodes that constitute one first sensing electrode may be sensed at the same time.

According to some embodiments, the first sensing signal lines may include first trace lines, which are on the first sensing region and connected to the first split electrodes, respectively, second trace lines, which are on the second sensing region and connected to the second split electrodes, respectively, and third trace lines which are on the third sensing region and connected to the third split electrodes, respectively.

According to some embodiments, the first split electrodes may be arranged on the first sensing region in the second direction, and the first trace lines may be connected to the first split electrodes of the first sensing electrodes through contact parts overlapping the first sensing region, respectively. The contact parts overlapping the first trace lines may be different in position in the second direction.

According to some embodiments, each of at least some of the first trace lines may extend toward an upper end of the first sensing region through an overlapping contact part among the contact parts in a plan view.

According to some embodiments, the first trace lines may have the same length on the first sensing region.

According to some embodiments, each of the first sensing electrodes may include first sensing patterns arranged in the second direction, and first connection patterns on a different layer from the first sensing patterns to connect the first sensing patterns, which are adjacent to each other in the second direction, to each other.

According to some embodiments, each of the first sensing signal lines may be connected to a corresponding first sensing electrode through the contact part, and the contact part may overlap one of the first sensing patterns of the corresponding first sensing electrode.

According to some embodiments, the display layer may include a plurality of emission regions that emit light having different colors, and the first sensing patterns may include a mesh pattern non-overlapping the plurality of emission regions.

According to some embodiments, the plurality of emission regions may include first to third emission regions that emit light having first to third colors, respectively, and the first to third emission regions may have different areas.

According to some embodiments, the area of the first emission region may be less than the area of the second emission region, and the light having the first color may have a wavelength range that is greater than a wavelength range of the light having the second color.

According to some embodiments, the sensor layer may further include second sensing signal lines connected to ends of the second sensing electrodes, respectively.

According to some embodiments, the display layer may include a base layer, a light emitting element on the base layer, and an encapsulation layer that seals the light emitting element, and the sensor layer may be in contact with the encapsulation layer.

According to some embodiments of the present disclosure, a sensor layer includes a sensor base layer, which includes a sensing region having a long side extending a first direction and having a short side extending in a second direction, first sensing electrodes in first to n-th rows, which are arranged on the sensing region in the second direction, second sensing electrodes in first to m-th columns, which are arranged on the sensing region in the first direction, first sensing signal lines, which are connected to the first sensing electrodes in the first to n-th rows through first to n-th contact parts overlapping the first sensing electrodes in the first to n-th rows, respectively, second sensing signal lines, which are connected to the second sensing electrodes in the first to m-th columns, respectively, and sensor pads adjacent to the first sensing electrode in the n-th row. Each of the n and the m may be a natural number of 2 or more, and each of at least two of the first sensing signal lines may extend from the sensor pads toward a position, which is parallel to the first contact part in the second direction, through an overlapping contact part among the first to n-th contact parts.

According to some embodiments, the first sensing signal lines may extend on the sensing region in the second direction, and the first sensing signal lines overlapping the sensing region may have the same length.

According to some embodiments, the sensing region may include first to k-th sensing regions arranged in the first direction. Each of the first sensing electrodes in the first to n-th rows may include first to k-th split electrodes that are in the first to k-th sensing regions, respectively, and the first sensing signal lines may include first to k-th trace lines that are on the first to k-th sensing regions to be connected to the first to k-th split electrodes, respectively. Here, the k is a natural number of 2 or more.

According to some embodiments, the first to k-th trace lines may have the same length on the first sensing region.

According to some embodiments, each of the first sensing electrodes in the first to n-th rows may include first sensing patterns arranged in the second direction, and first connection patterns on a different layer from the first sensing patterns to connect the first sensing patterns, which are adjacent to each other in the second direction, to each other.

BRIEF DESCRIPTION OF THE FIGURES

The accompanying drawings are included to provide a further understanding of embodiments according to the present disclosure, and are incorporated in and constitute a part of this specification. The drawings illustrate aspects of some embodiments of the present disclosure and, together with the description, serve to explain characteristics of some embodiments of the present disclosure. In the drawings.

DETAILED DESCRIPTION

Figure 1:
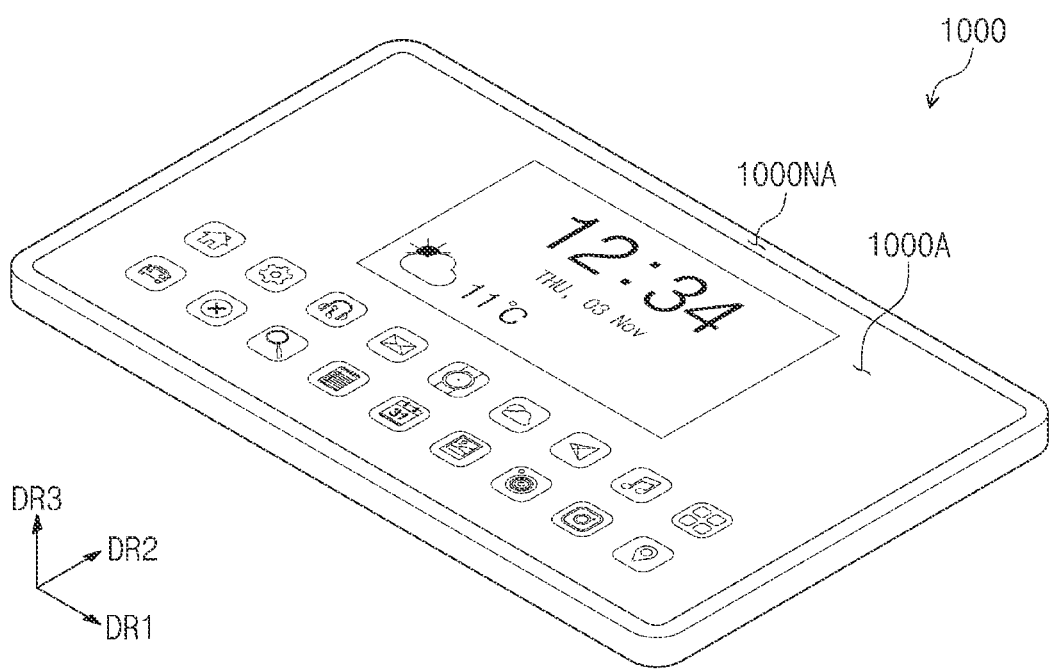
FIG. 1 is a perspective view of an electronic apparatus according to some embodiments of the present invention.

Embodiments of the inventive concept will be described below in detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

It will be understood that when an element (or region, layer, section, etc.) is referred to as being "on", "connected to" or "coupled to" another element, it can be located directly on, connected or coupled to the other element or a third intervening elements may be located between the elements.

Like reference numbers or symbols refer to like elements throughout. In addition, in the drawings, the thickness, the ratio, and the dimension of elements are exaggerated for effective description of the technical contents. The term "and/or" includes one or more combinations which may be defined by relevant elements.

It will be understood that, although the terms first, second, etc. may be used herein to describe various elements, these elements should not be limited by these terms. These terms are only used to distinguish one element from another element. For example, a first element could be termed a second element without departing from the teachings of the present invention, and similarly, a second element could be termed a first element. As used herein, the singular forms are intended to include the plural forms as well, unless the context clearly indicates otherwise.

In addition, the terms, such as "below", "beneath", "on" and "above", are used for explaining the relation of elements shown in the drawings. The terms are relative concept and are explained based on the direction shown in the drawing.

It will be further understood that the terms such as "includes" and "has", when used herein, specify the presence of stated features, numerals, steps, operations, elements, parts, or the combination thereof, but do not preclude the presence or addition of one or more other features, numerals, steps, operations, elements, parts, or the combination thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an electronic apparatus and a sensor layer according to some embodiments of the present disclosure will be described in more detail with reference to the accompanying drawings.

FIG. 1 is a perspective view of an electronic apparatus 1000 according to some embodiments of the present disclosure.

Referring to FIG. 1, the electronic apparatus 1000 may be an apparatus that is activated in response to an electrical signal. For example, the electronic apparatus 1000 may be a mobile phone, a notebook computer, a television, a tablet computer, a vehicle navigation unit, a game console, or a wearable device. However, embodiments according to the present disclosure are not limited thereto. FIG. 1 illustrates a tablet computer as an example of the electronic apparatus 1000.

The electronic apparatus 1000 may include an active region 1000A and a peripheral region 1000NA. The electronic apparatus 1000 may display images through the active region 1000A. The active region 1000A may include a surface defined by a first direction DR1 and a second direction DR2. The active region 1000A may have various shapes such as a polygonal shape (with or without rounded corners or vertices), a circular shape, or an oval shape, in a plan view. FIG. 1 illustrates aspects of embodiments in which the active region 1000A has a rectangular shape with vertices that are rounded in a plan view.

The peripheral region 1000NA may be adjacent to at least one side of the active region 1000A. For example, the peripheral region 1000NA may surround (e.g., in a periphery or outside a footprint of) the active region 1000A. The peripheral region 1000NA may have a lower light transmittance compared to the active region 1000A, and may be a region through which images are not displayed. For example, the peripheral region 1000NA may have a color (e.g., a set or predetermined color). However, embodiments according to the present disclosure are not limited thereto, and the peripheral region 1000NA may be omitted according to some embodiments.

A thickness direction of the electronic apparatus 1000 may be parallel to a third direction DR3 that is perpendicular to the surface defined by the first direction DR1 and the second direction DR2. Thus, a front surface (or top surface) and a rear surface (or bottom surface) of each of members, which constitute the electronic apparatus 1000, may be defined based on the third direction DR3.

FIG. 1 illustrates a bar type electronic apparatus 1000 according to some embodiments, but embodiments according to the present disclosure are not limited thereto. For example, the electronic apparatus 1000 may be a foldable electronic apparatus, a rollable electronic apparatus, or a slidable electronic apparatus, which has a flexible characteristic, and descriptions below may apply also to various flexible electronic apparatuses described above.

Figure 2:
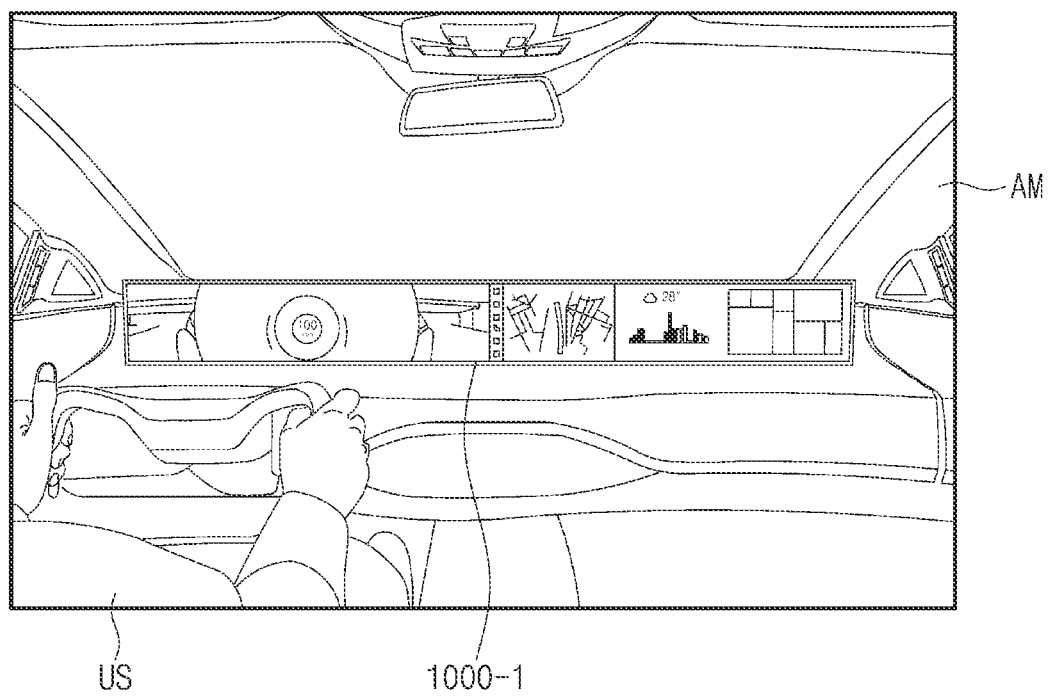
FIG. 2 is a view illustrating the interior of a vehicle in which an electronic apparatus is located according to some embodiments of the present invention.

FIG. 2 is a view illustrating the interior of a vehicle AM in which an electronic apparatus 1000-1 according to some embodiments of the present disclosure is located.

Referring to FIG. 2, the electronic apparatus 1000-1 may be located inside the vehicle AM. Although FIG. 2 illustrates that one electronic apparatus 1000-1 is located inside the vehicle AM, embodiments according to the present disclosure are not limited thereto. For example, a plurality of electronic apparatuses may be located inside the vehicle AM. In this case, the plurality of electronic apparatuses may include an electronic apparatus, which is located in front of a driver US, and an electronic apparatus which is arranged to face a passenger seat, for example. Embodiments according to the present disclosure are not limited thereto, however, and in some embodiments, the electronic apparatus may be located at various locations within the vehicle AM.

The electronic apparatus 1000-1 may display images, which are required or desired for driving, to the driver US driving the vehicle. For example, the electronic apparatus 1000-1 may display speed information, vehicle condition information, vehicle internal operation information, navigation information, and the like. The electronic apparatus 1000-1 may also display various information irrelevant to driving in addition to the information required for driving, for example, entertainment or graphical images.

As the electronic apparatus 1000-1 applies to various products such as the vehicle AM, the electronic apparatus 1000-1 may also have various picture ratios (e.g., aspect ratios or width to height ratios).

Figure 3:
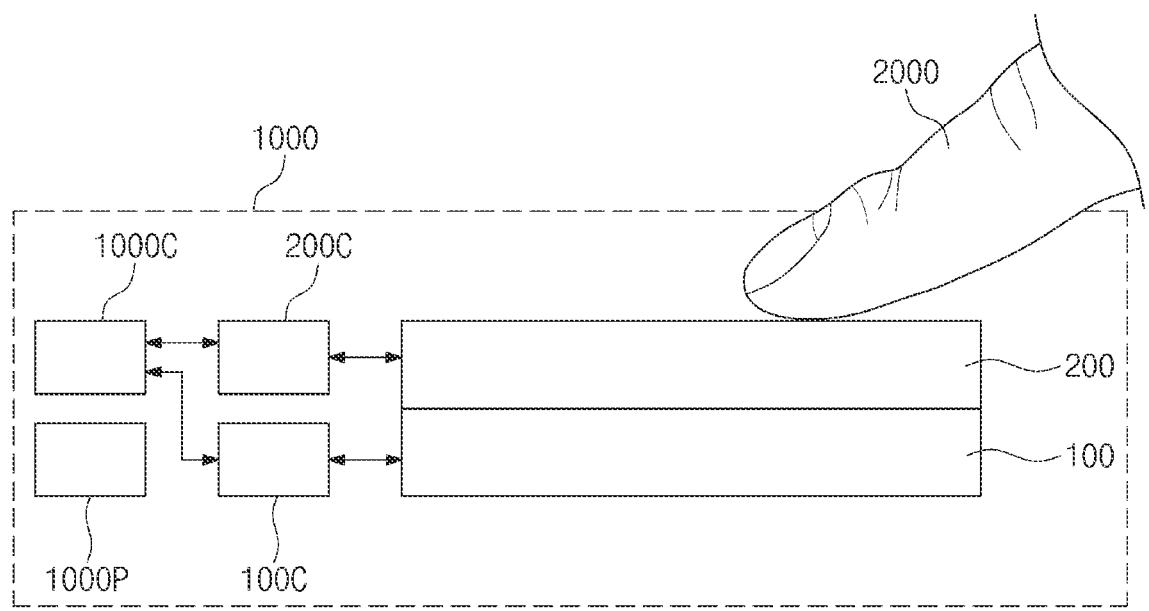
FIG. 3 is a block diagram of an electronic apparatus according to some embodiments of the present invention.

FIG. 3 is a schematic block diagram illustrating a usage example of an electronic apparatus 1000 according to some embodiments of the present disclosure.

Referring to FIG. 3, the electronic apparatus 1000 may include a display layer 100, a sensor layer 200, a display driving part 100C, a sensor driving part 200C, a main driving part 1000C, and a power circuit 1000P.

The display layer 100 may be a component that substantially generates an image. The display layer 100 may be a light emitting display layer. For example, the display layer 100 may be an organic light emitting display layer, an inorganic light emitting display layer, an organic-inorganic light emitting display layer, a quantum dot display layer, a micro LED display layer, or a nano LED display layer. However, the display layer 100 according to some embodiments is not limited thereto.

The sensor layer 200 may be located on the display layer 100. The sensor layer 200 may detect external input applied from the outside. The sensor layer 200 may be formed on a base surface of the display layer 100 through a continuous process to be integrally provided with the display layer 100. However, embodiments according to the present disclosure are not limited thereto, and the sensor layer 200 may be an external sensor attached onto the display layer 100.

The main driving part 1000C may control an overall operation of the electronic apparatus 1000. For example, the main driving part 1000C may control an operation of each of the display driving part 100C and the sensor driving part 200C. The main driving part 1000C may include at least one microprocessor, and the main driving part 1000C may be referred to as a host. The main driving part 1000C may further include a graphic controller.

The display driving part 100C may drive the display layer 100. The display driving part 100C may receive image data and a control signal from the main driving part 1000C, and the control signal may include various signals. For example, the control signal may include an input vertical synchronization signal, an input horizontal synchronization signal, a main clock, a data enable signal, and the like.

The sensor driving part 200C may drive the sensor layer 200. The sensor driving part 200C may receive a control signal from the main driving part 1000C. The control signal may include a clock signal of the sensor driving part 200C.

The power circuit 1000P may include a power management integrated circuit (PMIC). The power circuit 1000P may generate driving voltages for driving the display layer 100, the sensor layer 200, the display driving part 100C, and the sensor driving part 200C. For example, the driving voltages may include a gate high voltage, a gate low voltage, an ELVSS voltage, an ELVDD voltage, an initialization voltage, and the like, but are not particularly limited.

The electronic apparatus 1000 may detect inputs applied from the outside. For example, the electronic apparatus 1000 may detect a passive input by a touch 2000 (e.g., from a user's finger or a stylus). The touch 2000 may include all of input means capable of providing a variation in capacitance of the sensor layer 200, such as the user's body and an input device (e.g., a pen or a stylus).

Figure 4:
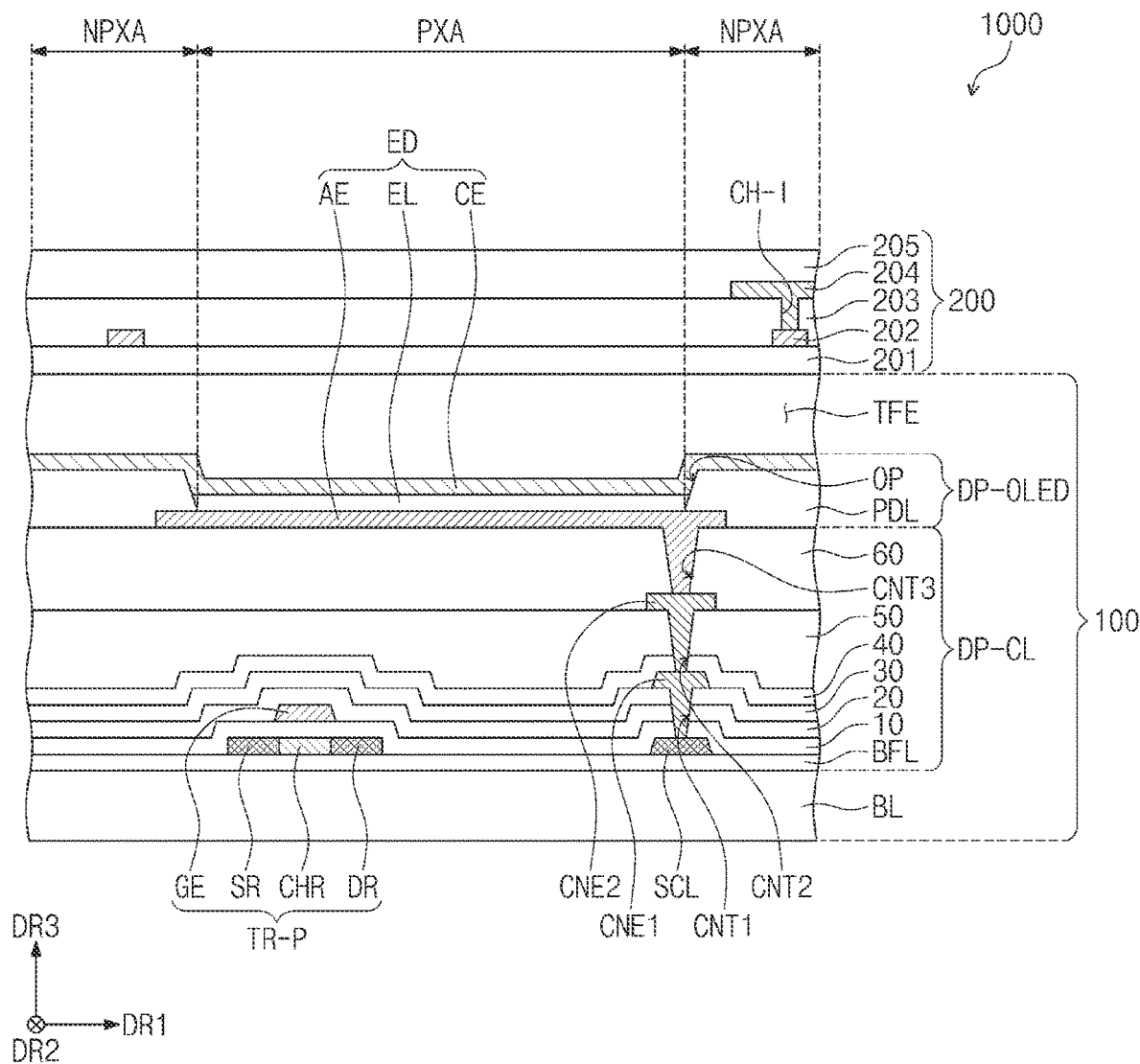
FIG. 4 is a cross-sectional view of an electronic apparatus according to some embodiments of the present invention.

FIG. 4 is a cross-sectional view of an electronic apparatus 1000 according to some embodiments of the present disclosure.

Referring to FIG. 4, the electronic apparatus 1000 may include a display layer 100 and a sensor layer 200. The foregoing descriptions may apply to the display layer 100 and the sensor layer 200.

The display layer 100 may include a base layer BL, a circuit layer DP-CL, a display element layer DP-OLED, and an encapsulation layer TFE.

The base layer BL may provide a base surface on which the circuit layer DP-CL is located. The base layer BL may be a rigid substrate, or a flexible substrate that is bendable, foldable, rollable, or the like. The base layer BL may include a glass substrate, a metal substrate, or a polymer substrate. However, embodiments according to the present disclosure are not limited thereto, and the base layer BL may include an inorganic layer, an organic layer, or a composite material layer.

The base layer BL may have a single-layer structure or a multilayer structure. For example, the base layer BL having a multilayer structure may include synthetic resin layers and at least one inorganic layer located between the synthetic resin layers. The synthetic resin layers may include a polyimide-based resin, an acrylic resin, a methacryl-based resin, a polyisoprene-based resin, a vinyl-based resin, an epoxy-based resin, a urethane-based resin, a cellulose-based resin, a siloxane-based resin, a polyamide-based resin, or a perylene-based resin.

The circuit layer DP-CL may be located on the base layer BL. The circuit layer DP-CL may include an insulation layer, a semiconductor pattern, and a conductive pattern. The insulation layer, a semiconductor layer, and a conductive layer may be formed on the base layer BL through coating, deposition or the like, and then, the insulation layer, the semiconductor layer and the conductive layer may be patterned to form the circuit layer DP-CL by performing a photolithography process multiple times. The insulation layer, the semiconductor pattern, and the conductive pattern of the circuit layer DP-CL may form a driving element such as a transistor, an connection electrode, a signal line, and the like.

The circuit layer DP-CL may include a buffer layer BFL, a transistor TR-P, a connection signal line SCL, connection electrodes CNE1 and CNE2, and insulation layers 10 to 60.

The buffer layer BFL may be located on the base layer BL. The buffer layer BFL may include an inorganic layer. The buffer layer BFL may have a multilayer structure in which inorganic layers are included. For example, the buffer layer BFL may include a silicon oxide layer and a silicon nitride layer that are stacked alternately. The buffer layer BFL may improve bonding force BL between the base layer BL and the semiconductor pattern or between the base layer BL and the conductive pattern.

The transistor TR-P may be located on the buffer layer BFL. The transistor TR-P may include the semiconductor pattern and a gate electrode GE. The semiconductor pattern of the transistor TR-P may be located on the buffer layer BFL. The semiconductor pattern of the transistor TR-P may include polysilicon, amorphous silicon, or a metal oxide, and is not limited to any one as long as having semiconductor properties.

FIG. 4 illustrates a portion of the semiconductor pattern, and a semiconductor pattern may be further arranged over pixels according to a specific rule in a plan view. The semiconductor pattern may include regions having different electrical properties according to whether the semiconductor pattern is doped or not or whether the semiconductor pattern is reduced or not. The semiconductor pattern may include a first region with high conductivity and a second region with low conductivity. The first region may be doped with an n-type or p-type dopant or may be a region in which a metal oxide is reduced. The second region may be a region that is not doped, a region doped at a lower concentration than the first doped region, or a non-reduced region. The first region with high conductivity may substantially serve as an electrode or a signal line, and the second region with low conductivity correspond to an active region (or channel region) of the transistor TR-P.

A source region SR, a channel region CHR, and a drain region DR of the transistor TR-P may be formed from the semiconductor pattern. The source region SR and the drain region DR may be provided in opposite directions based on the channel region CHR. The connection signal line SCL may be located on the same layer (e.g., buffer layer BFL) as the semiconductor pattern. The connection signal line SCL may extend from the semiconductor pattern or electrically connected to the semiconductor pattern in a plan view.

The insulation layers 10 to 60 may include first to sixth insulation layers 10 to 60. The first to sixth insulation layers 10 to 60 may overlap pixels in common. The first to sixth insulation layers 10 to 60 may include at least one of an inorganic layer or an organic layer. For example, the inorganic layer may include at least one of silicon nitride, aluminum oxide, titanium oxide, silicon oxide, silicon oxynitride, zirconium oxide, or hafnium oxide, but is not limited to the foregoing materials. The organic layer may include a phenol-based polymer, an acrylic polymer, an imide-based polymer, an acryl ether-based polymer, an amide-based polymer, a fluorine-based polymer, a p-xylene-based polymer, a vinyl alcohol-based polymer, a blend thereof, or the like, and is not limited to the foregoing materials.

The first insulation layer 10 may be located on the buffer layer BFL. The first insulation layer 10 may cover the semiconductor pattern of the transistor TR-P and the connection signal line SCL.

The gate electrode GE of the transistor TR-P may be located on the first insulation layer 10. The gate electrode GE may be a portion of the conductive pattern. The gate electrode GE may include titanium, copper, silver, molybdenum, aluminum, tungsten, an aluminum nitride, a tungsten nitride, an indium tin oxide, an indium zinc oxide, or an alloy thereof, but is not limited to the foregoing materials.

The gate electrode GE may overlap the channel region CHR. The gate electrode GE may function as a mask in the doping of the semiconductor pattern of the transistor TR-P.

The second insulation layer 20 may be located on the first insulation layer 10. The second insulation layer 20 may cover the gate electrode GE. The third insulation layer 30 may be located on the second insulation layer 20.

The connection electrodes CNE1 and CNE2 may include a first connection electrode CNE1 and a second connection electrode CNE2 that are located on different layers. The first connection electrode CNE1 may be located on the third insulation layer 30. The first connection electrode CNE1 may be connected to the connection signal line SCL through a contact hole CNT1 passing through the first to third insulation layers 10 to 30.

The fourth insulation layer 40 may be located on the third insulation layer 30. The fourth insulation layer 40 may cover the first connection electrode CNE1. The fifth insulation layer 50 may be located on the fourth insulation layer 40.

The second connection electrode CNE2 may be located on the fifth insulation layer 50. The second connection electrode CNE2 may be connected to the first connection electrode CNE1 through a contact hole CNT2 passing through the fourth and fifth insulation layers 40 and 50.

The sixth insulation layer 60 may be located on the fifth insulation layer 50. The sixth insulation layer 60 may cover the second connection electrode CNE2. At least one of the fifth insulation layer 50 or the sixth insulation layer 60 may include an organic layer. The organic layer may cover a stepped portion between components, which are located at a lower portion, to provide an upper portion with a flat surface. However, embodiments according to the present disclosure are not necessarily limited thereto.

The stacked structure of the circuit layer DP-CL illustrated in FIG. 4 is an example, and the stacked structure of the circuit layer DP-CL may be changed on a cross-sectional view according to a process of manufacturing a driving circuit of a pixel or the circuit layer DP-CL.

The display element layer DP-OLED may be located on the circuit layer DP-CL. The display element layer DP-OLED may include a light emitting element ED and a pixel defining film PDL. The light emitting element ED may include an organic light emitting element, an inorganic light emitting element, a micro LED, a nano LED, or the like. The light emitting element ED may include a first electrode AE, an emission layer EL, and a second electrode CE.

The first electrode AE and the pixel defining film PDL may be located on the sixth insulation layer 60. The first electrode AE may be connected to the second connection electrode CNE2 through a contact hole CNT3 passing through the sixth insulation layer 60. The first electrode AE may be electrically connected to the connection signal line SCL through the first and second connection electrodes CNE1 and CNE2. However, embodiments according to the present disclosure are not limited thereto. For example, one of the first and second connection electrodes CNE1 and CNE2 may be omitted or an additional connection electrode may be further arranged which electrically connects the first electrode AE and the connection signal line SCL to each other.

The first electrode AE may be a semi-transmissive electrode or a reflective electrode. For example, the first electrode AE may include a reflective layer formed of silver, magnesium, aluminum, platinum, palladium, gold, nickel, neodymium, iridium, chromium, a compound thereof, or the like, and a transparent or semi-transparent electrode layer formed on the reflective layer. The transparent or semi-transparent electrode layer may include a zinc oxide, an indium oxide, an indium tin oxide, an indium zinc oxide, an indium gallium zinc oxide, an aluminum-doped zinc oxide, or the like.

An emission opening portion OP provided to pass through the pixel defining film PDL may be defined in the pixel defining film PDL. The emission opening portion OP may expose at least one portion of the first electrode AE. The one portion of the first electrode AE, which is exposed from the pixel defining film PDL by the emission opening portion OP, may be defined as an emission region PXA. The region in which the pixel defining film PDL is located may be defined as a non-emission region NPXA. The non-emission region NPXA may surround the emission region PXA in a plan view.

According to some embodiments, the pixel defining film PDL may have a light absorbing property. For example, the pixel defining film PDL may have a black color and include a black coloring agent. The black coloring agent may include a black pigment or a black dye. The black coloring agent may include a metal such as chrome, an oxide thereof, or a carbon black. However, the pixel defining film PDL of embodiments according to the present disclosure are not limited thereto.

The emission layer EL may be located on the first electrode AE. The emission layer EL may be arranged to correspond to the emission opening portion OP. That is, the emission layer EL may be separately provided in each of pixels. The emission layer EL may emit light having at least one color of a blue color, a red color, and a green color. However, embodiments according to the present disclosure are not limited thereto, and the emission layer EL may be provided in common in the pixels to emit source light such as blue light or white light.

The second electrode CE may be located on the emission layer EL. The second electrode CE may overlap the emission region PXA and the non-emission region NPXA. The second electrode CE may be a common electrode, which is arranged in common in the pixels, or may be provided with a common voltage.

Meanwhile, the light emitting element ED may further include a light-emitting functional layer located between the first electrode AE and the second electrode CE. For example, the light emitting element ED may include at least one of a hole control layer, which is located between the first electrode AE and the emission layer EL, or an electron control layer which is located between the emission layer EL and the second electrode CE. The hole control layer may include at least one of a hole injection layer, a hole transport layer, or an electron blocking layer, and the electron control layer may include at least one of an electron injection layer, an electron transport layer, or a hole blocking layer.

The encapsulation layer TFE may be located on the second electrode CE to seal the light emitting element ED. The encapsulation layer TFE may include a plurality of thin films. The thin films of the encapsulation layer TFE may be configured to improve optical efficiency of the light emitting elements or protect the light emitting element ED. For example, the encapsulation layer TFE may include at least one of an inorganic film or an organic film. The inorganic film of the encapsulation layer TFE may protect the light emitting element ED from moisture and oxygen, and the organic film may protect the light emitting element ED from foreign matters such as dust particles.

The sensor layer 200 may be located directly on the display layer 100 through a continuous process. For example, the sensor layer 200 may be located directly on a top surface of the encapsulation layer TFE. The sensor layer 200 may include a sensor base layer 201, a first sensor conductive layer 202, a sensor insulation layer 203, a second sensor conductive layer 204, and a sensor cover layer 205. However, embodiments according to the present disclosure are not limited thereto, and the sensor base layer 201 may be omitted. When the sensor base layer 201 is omitted, the first sensor conductive layer 202 may be located directly on the top surface of the encapsulation layer TFE.

The sensor base layer 201 may include an inorganic layer. For example, the sensor base layer 201 may include at least one of silicon nitride, silicon oxynitride, or silicon oxide. However, embodiments according to the present disclosure are not limited thereto, and the sensor base layer 201 may include an organic layer. For example, the sensor base layer 201 may include an epoxy-based resin, an acrylic resin, or an imide-based resin. The sensor base layer 201 may have a single-layer structure or a multilayer structure.

Each of the first sensor conductive layer 202 and the second sensor conductive layer 204 may be a conductive layer having a single-layer structure or a conductive layer having a multilayer structure. The conductive layer having a single-layer structure may include a metal layer or a transparent conductive layer. The metal layer may include molybdenum, silver, titanium, copper, aluminum, or an alloy thereof. The transparent conductive layer may include a transparent conductive oxide such as indium tin oxide, indium zinc oxide, zinc oxide, or indium zinc tin oxide. However, embodiments according to the present disclosure are not limited thereto, and the transparent conductive layer may include a conductive polymer such as poly(3,4-ethylenedioxythiophene) (PEDOT), metal nanowire, graphene, or the like.

The conductive layer having a multilayer structure may include metal layers, which are stacked in the third direction DR3, or include at least one metal layer and at least one transparent conductive layer. For example, the conductive layer having a multilayer structure may include a three-layer structure of titanium/aluminum/titanium.

The sensor insulation layer 203 may be located between the first sensor conductive layer 202 and the second sensor conductive layer 204. The sensor insulation layer 203 may include an inorganic layer or an organic layer. For example, the inorganic layer of the sensor insulation layer 203 may include at least one of silicon oxynitride, silicon oxide, silicon nitride, zirconium oxide, aluminum oxide, titanium oxide, or hafnium oxide. The organic layer of the sensor insulation layer 203 may include at least one of acrylic resin, methacryl-based resin, polyisoprene-based resin, vinyl-based resin, epoxy-based resin, urethane-based resin, cellulose-based resin, siloxane-based resin, polyimide-based resin, polyamide-based resin, or perylene-based resin.

The first sensor conductive layer 202 and the second sensor conductive layer 204 may include touch electrodes TX and RX (see FIG. 5A) of the sensor layer 200 to be described in more detail later. Some conductive patterns included in the first sensor conductive layer 202 and the second sensor conductive layer 204 may be insulated from each other with the sensor insulation layer 203 therebetween, or may be electrically connected to each other through a contact hole CH-I passing through the sensor insulation layer 203.

The sensor cover layer 205 may be located on the sensor insulation layer 203 to cover the second sensor conductive layer 204. The sensor cover layer 205 may cover the conductive pattern included in the second sensor conductive layer 204 and minimize an occurrence of damage to the conductive pattern during a subsequent process. However, embodiments according to the present disclosure are not limited thereto, and the sensor cover layer 205 may be omitted.

Figure 5A:
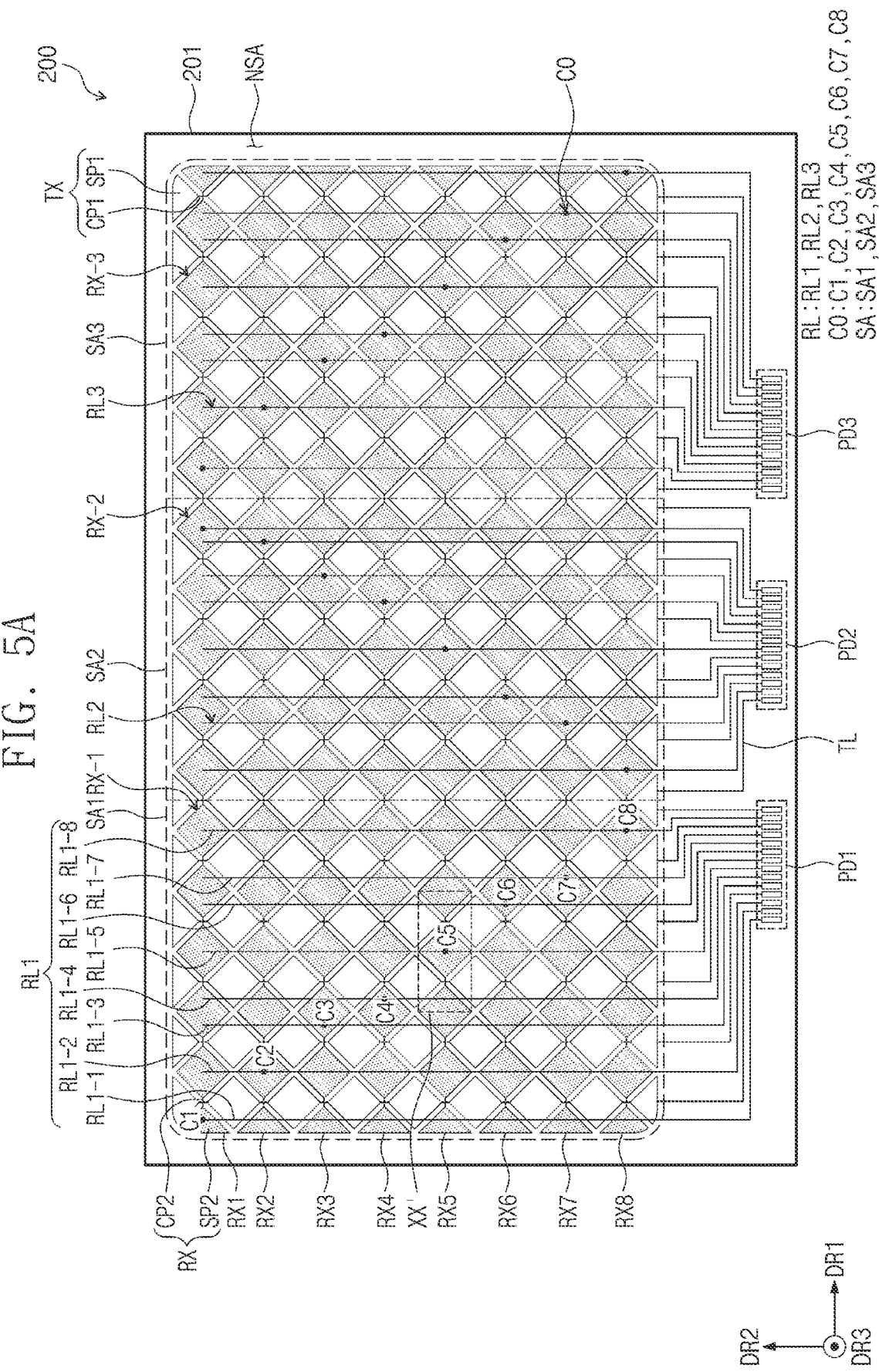
FIGS. 5A to 5C are plan views of a sensor layer according to some embodiments of the present invention.
Figure 5B:
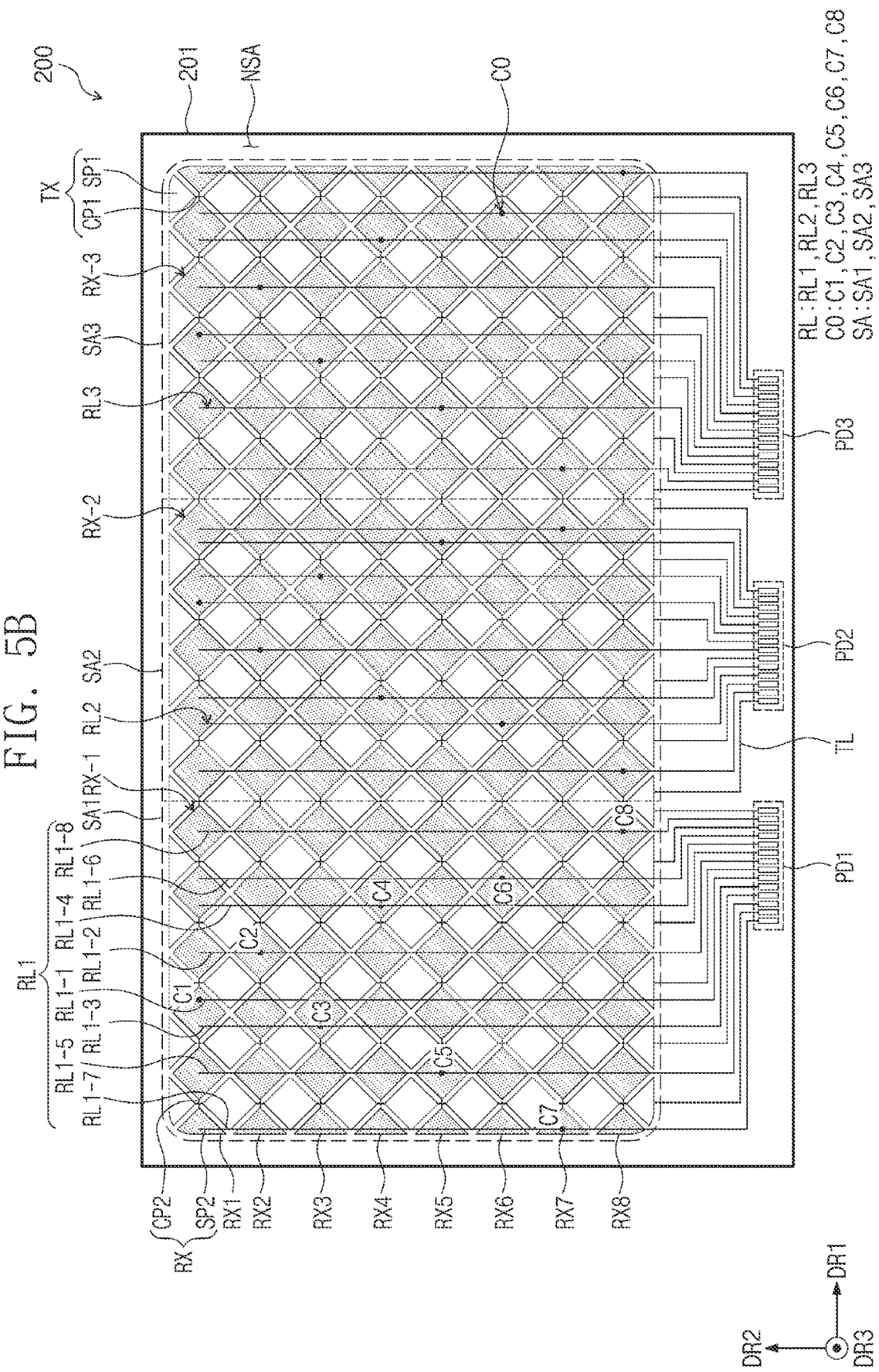
Figure 5C:
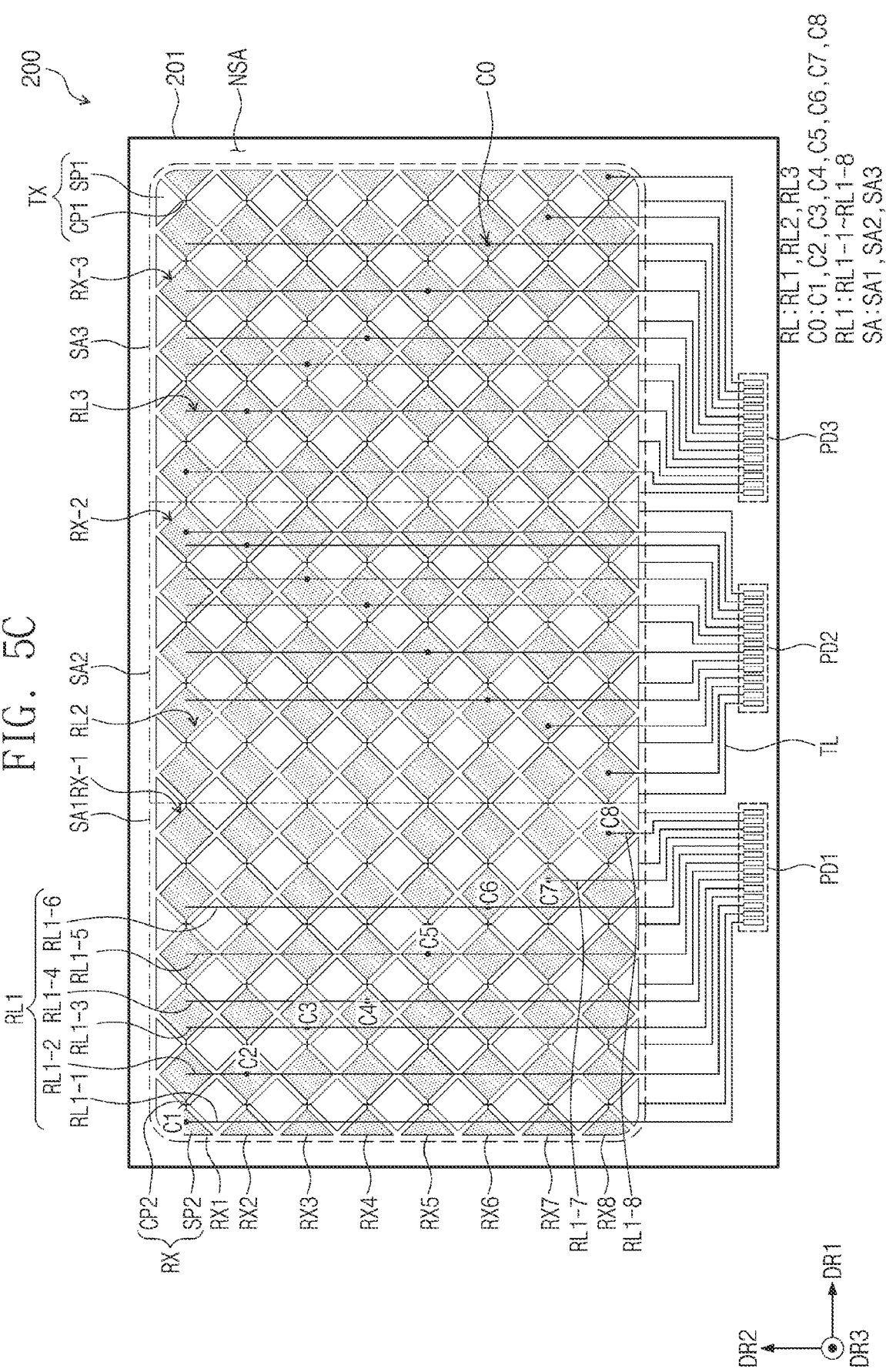

FIGS. 5A to 5C are plan views of a sensor layer 200 according to some embodiments of the present disclosure.

Referring to FIG. 5A, the sensor layer 200 may include a sensing region SA and a non-sensing region NSA adjacent to the sensing region SA. The sensing region SA may be a region in which electrodes of the sensor layer 200 are configured to detect an external input. The non-sensing region NSA may be a region in which elements or wirings for driving the electrodes located in the sensing region SA are located.

The sensor layer 200 may include first sensing electrodes TX and second sensing electrodes RX, which are located in the sensing region SA on the sensor base layer 201. The first sensing electrodes TX and the second sensing electrodes RX may cross each other and be electrically insulated from each other in a plan view. The sensor layer 200 may obtain information of the external input through a variation in capacitance between the first sensing electrodes TX and the second sensing electrodes RX.

Each of the first sensing electrodes TX may extend in the second direction DR2, and the first sensing electrodes TX may be arranged in the first direction DR1. Each of the second sensing electrodes RX may extend in the first direction DR1, and the second sensing electrodes RX may be arranged in the second direction DR2. Although FIG. 5A illustrates 16 first sensing electrodes TX and 8 second sensing electrodes RX (RX1 to RX8) as an example, the number of the first sensing electrodes TX and the number of the second sensing electrodes RX, which are included in the sensor layer 200, are not limited thereto.

Each of the first sensing electrodes TX may include first sensing patterns SP1 and first connection patterns CP1. The first sensing patterns SP1 may be arranged in the second direction DR2, and each of the first connection patterns CP1 may connect the first sensing patterns SP1, which are adjacent to each other in the second direction DR2, to each other. The first connection patterns CP1 may be located on the same layer as the first sensing patterns SP1 to have an integral shape. That is, the first connection patterns CP1 may extend from the first sensing patterns SP1. However, embodiments according to the present disclosure are not limited thereto as long as each of the first connection patterns CP1 is electrically connected to the first sensing patterns SP1 adjacent thereto.

Each of the second sensing electrodes RX may include second sensing patterns SP2 and second connection patterns CP2. The second sensing patterns SP2 may be arranged in the first direction DR1, and each of the second connection patterns CP2 may connect the second sensing patterns SP2, which are adjacent to each other in the first direction DR1, to each other. The second connection patterns CP2 may be located on a different layer from the second sensing patterns SP2 and connected through a contact hole passing through an insulation layer (e.g., the sensor insulation layer 203 in FIG. 4). The second connection patterns CP2 may be defined as bridge patterns, each of which connects the second sensing patterns SP2 arranged on a different layer. However, embodiments according to the present disclosure are not limited thereto as long as the second connection patterns CP2 are insulated from the first sensing electrodes TX and electrically connected to the second sensing patterns SP2.

According to some embodiments, the first sensing patterns SP1, the first connection patterns CP1, and the second sensing patterns SP2 may be located on the same layer. The second connection patterns CP2 may be located on a different layer from the second sensing patterns SP2. For example, the first sensing patterns SP1, the first connection patterns CP1, and the second sensing patterns SP2 may be included in the second sensor conductive layer 204 illustrated in FIG. 4, and the second connection patterns CP2 may be included in the first sensor conductive layer 202 illustrated in FIG. 4. However, embodiments according to the present disclosure are not limited thereto. For example, the first sensing patterns SP1, the first connection patterns CP1, and the second sensing patterns SP2 may be included in the first sensor conductive layer 202, and the second connection patterns CP2 may be included in the second sensor conductive layer 204.

The sensor layer 200 may include first sensing signal lines TL that are connected to the first sensing electrodes TX, respectively. The first sensing signal lines TL may be located on a different layer from the first sensing electrodes TX to be connected through a contact part. For example, each of the first sensing signal lines TL may be connected to a lower end side of a corresponding first sensing electrode TX through the contact part. Alternatively, each of the first sensing signal lines TL may overlap the first sensing pattern SP1 of the corresponding first sensing electrode TX and be connected through the contact part. However, embodiments according to the present disclosure are not limited thereto. For example, the first sensing signal lines TL may be located on the same layer as the first sensing electrodes TX, and may extend from the corresponding first sensing electrodes TX and have an integral shape with the corresponding first sensing electrodes TX.

The sensor layer 200 may include second sensing signal lines RL that are connected to the second sensing electrodes RX, respectively. The second sensing signal lines RL may be located on a different layer from the second sensing electrodes RX to be connected through a contact part C0. For example, each of the second sensing signal lines RL may overlap the second sensing pattern SP2 of a corresponding second sensing electrode RX and be connected to the corresponding second sensing electrode RX through the contact part C0 provided within the sensing region SA. That is, the second sensing signal lines RL may overlap the sensing region SA in a plan view, and extend from the sensing region SA to be located on the non-sensing region NSA. The second sensing signal lines RL may be located on the same layer as the first sensing signal lines TL. However, embodiments according to the present disclosure are not necessarily limited thereto.

As the second sensing signal lines RL are arranged to extend within the sensing region SA in the second direction DR2, an area in which the second sensing signal lines RL are located on the non-sensing region NSA may be minimized. Accordingly, the area of the non-sensing region NSA may be reduced. As a result, the area of the peripheral region 1000NA (see FIG. 1) of the electronic apparatus 1000 (see FIG. 1) may be reduced to achieve a narrow bezel.

The sensor layer 200 may have a shape in which a length in the first direction DR1 is greater than a length in the second direction DR2 in a plan view. The sensing region SA may have a shape, in which a length in the first direction DR1 is greater than a length in the second direction DR2, to correspond to the shape of the sensor layer 200. The sensing region SA extending in the first direction DR1 may be divided into a first sensing region SA1, a second sensing region SA2, and a third sensing region SA3 in the first direction DR1. That is, the sensing region SA may be divided into a plurality of sensing regions in a direction in which the sensing region SA has a relatively long side. Although FIG. 5A illustrates the sensing region SA divided into the first to third sensing regions SA1 to SA3, embodiments may be variously changed according to the area of each of the sensor layer 200 and the sensing region SA.

According to the picture ratio of each of the electronic apparatuses 1000 and 1000-1 (see FIGS. 1 and 2), the sensing region SA may extend in the first direction DR1 and consequently, a length of each of the second sensing electrodes RX may be greater than a length of each of the first sensing electrodes TX. As the length of each of the second sensing electrodes RX in an extension direction (e.g., the first direction DR1) increases, the load of the second sensing electrodes RX may increase.

In order to reduce the load applied to the second sensing electrodes RX, each of the second sensing electrodes RX may be split into a plurality of split electrodes RX-1, RX-2 and RX-3 that correspond to the first to third sensing regions SA1 to SA3, respectively. The split electrodes RX-1, RX-2 and RX-3 may be sensed at the same time in one row arranged in the first direction DR1, i.e., within one second sensing electrode RX.

As an example, FIG. 5A illustrates the second sensing electrodes RX1 to RX8 in first to eighth rows. However, the number of the rows of the second sensing electrodes RX included in the sensor layer 200 is not limited thereto. Among the second sensing electrodes RX1 to RX8 in the first to eighth rows, the second sensing electrode RX1 in the first row may be arranged to be most adjacent to an upper end of the sensor layer 200, and the second sensing electrode RX8 in the eighth row may be arranged to be most adjacent to a lower end of the sensor layer 200 in a plan view. Each of the second sensing electrodes RX1 to RX8 in the first to eighth rows may be split into the plurality of split electrodes RX-1, RX-2 and RX-3. The split electrodes RX-1, RX-2 and RX-3 may be sensed at the same time within the second sensing electrode RX1 in the first row.

The second sensing signal lines RL may include first to third trace lines RL1 to RL3 that are located in the first to third sensing regions SA1 to SA3, respectively. Accordingly, the split electrodes RX-1, RX-2 and RX-3 that constitute the second sensing electrode RX in one row may be sensed at the same time.

The first trace lines RL1 may extend within the first sensing region SA1 in the second direction DR2. The first trace lines RL1 may be connected to the first split electrodes RX-1 of the second sensing electrodes RX1 to RX8 in the first to eighth rows, respectively.

The second trace lines RL2 may extend within the second sensing region SA2 in the second direction DR2. The second trace lines RL2 may be connected to the second split electrodes RX-2 of the second sensing electrodes RX1 to RX8 in the first to eighth rows, respectively.

The third trace lines RL3 may extend within the third sensing region SA3 in the second direction DR2. Each of the third trace lines RL3 may be connected to the third split electrodes RX-3 of each of the second sensing electrodes RX1 to RX8 in the first to eighth rows.

The sensor layer 200 may include sensor pads PD1, PD2 and PD3. The sensor pads PD1, PD2 and PD3 may be arranged to be adjacent to the lower end of the sensor layer 200 and be arranged in the first direction DR1. The sensor pads PD1, PD2 and PD3 may be portions, each of which is electrically connected to the sensor driving part 200C (see FIG. 3). A driving signal received from the sensor driving part 200C (see FIG. 3) through the sensor pads PD1, PD2 and PD3 may be transmitted to the first sensing electrodes TX or the second sensing electrodes RX, or a sensing signal received from the first sensing electrodes TX or the second sensing electrodes RX may be transmitted to the sensor driving part 200C (see FIG. 3).

The sensor pads PD1, PD2 and PD3 may include first to third sensor pads PD1 to PD3. The first to third sensor pads PD1 to PD3 may be located on the same layer to be formed through the same process at the same time. The first to third sensor pads PD1 to PD3 may be divided according to a region in which the second sensing signal lines RL corresponding and connected thereto are located. For example, the first sensor pads PD1 may be electrically connected to the first trace lines RL1, which are located within the first sensing region SA1, of the second sensing signal lines RL. The second sensor pads PD2 may be electrically connected to the second trace lines RL2 that are located within the second sensing region SA2. The third sensor pads PD3 may be electrically connected to the third trace lines RL3 that are located within the third sensing region SA3.

Some of the first sensor pads PD1 may be electrically connected to the first sensing signal lines TL connected to the first sensing electrodes TX, which are located in the first sensing region SA1, among the first sensing electrodes TX. Some of the second sensor pads PD2 may be electrically connected to the first sensing signal lines TL connected to the first sensing electrodes TX, which are located in the second sensing region SA2, among the first sensing electrodes TX. Some of the third sensor pads PD3 may be electrically connected to the first sensing signal lines TL connected to the first sensing electrodes TX, which are located in the third sensing region SA3, among the first sensing electrodes TX.

The first trace lines RL1 may include first to eighth lines RL1-1 to RL1-8, which are arranged in the first direction DR1, within the first sensing region SA1. The number of the first trace lines RL1 within the first sensing region SA1 may be the same as the number of the rows of the second sensing electrodes RX located within the first sensing region SA1. The first to eighth lines RL1-1 to RL1-8 may be connected to the first split electrodes RX-1 of the second sensing electrodes RX1 to RX8 in the first to eighth rows through first to eighth contact parts C1 to C8, respectively.

The first split electrodes RX-1 of the second sensing electrodes RX1 in the first row, which are arranged to be farthest away from the first sensor pads PD1, among the second sensing electrodes RX1 to RX8 in the first to eighth rows, may be connected to the first line RL1-1 through the first contact part C1. The first contact part C1 may be a portion that is provided to pass through an insulation layer, which is located between the second sensing electrode RX1 in the first row and the first line RL1-1, to connect the second sensing electrode RX1 in the first row and the first line RL1-1, which are located in different layers, to each other. Likewise, the second to eighth contact parts C2 to C8 may also be portions, each of which connects a second sensing electrode and a line, which correspond to each other, to each other.

The first contact part C1 may overlap any one of the second sensing patterns SP2 that constitute the first split electrode RX-1 of the second sensing electrode RX1 in the first row. For example, as illustrated in FIG. 5A, the first contact part C1 may overlap the second sensing pattern SP2 located on the leftmost side, among the second sensing patterns SP2 of the first split electrode RX-1 of the second sensing electrode RX1 in the first row. However, the position of the first contact part C1 is not necessarily limited thereto.

The first split electrode RX-1 of the second sensing electrode RX8 in the eighth row, which are arranged to be most adjacent to the first sensor pads PD1, among the second sensing electrodes RX1 to RX8 in the first to eighth rows, may be connected to the eighth line RL1-8 through the eighth contact part C8. The eighth contact part C8 may overlap any one of the second sensing patterns SP2 that constitute the first split electrode RX-1 of the second sensing electrode RX8 in the eighth row. For example, as illustrated in FIG. 5A, the eighth contact part C8 may overlap the second sensing pattern SP2 located on the rightmost side, among the second sensing patterns SP2 of the first split electrode RX-1 of the second sensing electrode RX8 in the eighth row. However, the position of the eighth contact part C8 is not necessarily limited thereto.

The positions of the first to eighth contact parts C1 to C8 in the second direction DR2 may be different from each other. For example, within the first sensing region SA1, the first contact part C1 may be adjacent to an upper end of the first sensing region SA1, and the eighth contact part C8 may be adjacent to a lower end of the first sensing region SA1. The second to seventh contact parts C2 to C7 may be located between the first contact part C1 and the eighth contact part C8 in the second direction DR2.

The positions of the first to eighth contact parts C1 to C8 in the first direction DR1 may be different from each other. For example, within the first sensing region SA1, the first contact part C1 may be adjacent to a left side of the first sensing region SA1, and the eighth contact part C8 may be adjacent to a right side of the first sensing region SA1. The second to seventh contact parts C2 to C7 may be located between the first contact part C1 and the eighth contact part C8 in the first direction DR1.

In the aspect of a position of a contact part from the lower end of the first sensing region SA1 in the second direction DR2, the first contact part C1 among the first to eighth contact parts C1 to C8 may be farthest from the lower end and the eighth contact part C8 may be most adjacent to the lower end. The first line RL1-1 may be required to extend to the position of the first contact part C1 in the second direction DR2, in order to be connected to the first split electrode RX-1 of the second sensing electrode RX1 in the first row. The eighth line RL1-8 may be connected to the first split electrode RX-1 of the second sensing electrode RX8 in the eighth row even when the eighth line RL1-8 extends only to the position of the eighth contact part C8 in the second direction DR2.

However, when the eighth line RL1-8 extends only to the position of the eighth contact part C8 in the second direction DR2, a length different between the eighth line RL1-8 and the first line RL1-1 may increase. Likewise, when each of the second to seventh lines RL1-2 to RL1-7 extends only to the position of a corresponding contact part (the second to seventh contact parts C2 to C7) in the second direction DR2, a length difference between the first trace lines RL1 may occur.

As the first trace lines RL1 are located within the first sensing region SA1 to overlap the first sensing electrodes TX or the second sensing electrodes RX, a parasitic capacitance may be formed. As the length difference occurs between the first trace lines RL1, a difference may occur also between parasitic capacitances formed in the first trace lines RL1, and the difference may affect sensitivity of the sensor layer 200 according to a region.

The extension lengths of the first to eighth lines RL1-1 to RL1-8 of the first trace lines RL1 according to some embodiments of the present disclosure may be substantially the same within the first sensing region SA1. For example, the second line RL1-2 may not extend only to the position of the second contact part C2 from the lower end of the first sensing region SA1 and may further extend toward the upper end of the first sensing region SA1. For example, the second line RL1-2 may further extend to a position, which is parallel to the first contact part C1, from the second contact part C2. As a result, the second contact part C2 may be spaced apart from an end of the second line RL1-2 in a plan view.

Likewise, the third to eighth lines RL1-3 to RL1-8 may further extend to positions, which are parallel to the first contact part C1, from the third to eighth contact parts C3 to C8, respectively. Accordingly, a length difference between the first to eighth lines RL1-1 to RL1-8 of the first trace lines RL1 may be minimized.

Although the first trace lines RL1 are described based on the first sensing region SA1, the description may also apply to the second trace lines RL2 within the second sensing region SA2 and the third trace lines RL3 within the third sensing region SA3.

The second trace lines RL2 may include first to eight lines. The first to eight lines of the second trace lines RL2 may be connected to the second split electrodes RX-2 of the second sensing electrodes RX1 to RX8 in the first to eighth rows through each of first to eighth contact parts, respectively. For example, the first line of the second trace lines RL2 may be connected to the second split electrode RX-2 of the second sensing electrode RX1 in the first row through the first contact part. The eighth line of the second trace lines RL2 may be connected to the second split electrode RX-2 of the second sensing electrode RX8 in the eighth row through the eighth contact part.

The first contact part of the first line within the second sensing region SA2 may overlap the second sensing pattern SP2 located on the rightmost side, among the second sensing patterns SP2 of the second split electrode RX-2 of the second sensing electrode RX1 in the first row. The eighth contact part of the eighth line within the second sensing region SA2 may overlap the second sensing pattern SP2 located on the leftmost side, among the second sensing patterns SP2 of the second split electrode RX-2 of the second sensing electrode RX8 in the eighth row. Within the second sensing region SA2, the first contact part may be adjacent to a right side of the second sensing region SA2, and the eighth contact part may be adjacent to a left side of the second sensing region SA2. The second to seventh contact parts may be located between the first contact part and the eighth contact part in the first direction DR1. However, the position of each of the first to eighth contact parts within the second sensing region SA2 is not necessarily limited thereto. For example, within the second sensing region SA2, the first contact part may be adjacent to the left side of the second sensing region SA2, and the eighth contact part may be adjacent to the right side of the second sensing region SA2.

The third trace lines RL3 may include first to eight lines. The first to eight lines of the third trace lines RL3 may be connected to the third split electrodes RX-3 of the second sensing electrodes RX1 to RX8 in the first to eighth rows through each of first to eighth contact parts, respectively. For example, the first line of the third trace lines RL3 may be connected to the third split electrode RX-3 of the second sensing electrode RX1 in the first row through the first contact part. The eighth line of the third trace lines RL3 may be connected to the third split electrode RX-3 of the second sensing electrode RX8 in the eighth row through the eighth contact part.

The first contact part of the first line within the third sensing region SA3 may overlap the second sensing pattern SP2 located on the leftmost side, among the second sensing patterns SP2 of the third split electrode RX-3 of the second sensing electrode RX1 in the first row. The eighth contact part of the eighth line within the third sensing region SA3 may overlap the second sensing pattern SP2 located on the rightmost side, among the second sensing patterns SP2 of the third split electrode RX-3 of the second sensing electrode RX8 in the eighth row. Within the third sensing region SA3, the first contact part may be adjacent to a right side of the third sensing region SA3, and the eighth contact part may be adjacent to a left side of the third sensing region SA3. The second to seventh contact parts may be located between the first contact part and the eighth contact part in the first direction DR1. However, the position of each of the first to eighth contact parts within the third sensing region SA3 is not necessarily limited thereto.

The extension lengths of the first to eighth lines of the second trace lines RL2 according to some embodiments of the present disclosure may be substantially the same within the second sensing region SA2. Each of the second to eighth lines of the second trace lines RL2 may extend from a corresponding contact part to a position, which is parallel to the first contact part adjacent to the upper end of the second sensing region SA2, in the second direction DR2. Accordingly, a length difference between the second trace lines RL2 may be minimized.

The extension lengths of the first to eighth lines of the third trace lines RL3 according to some embodiments of the inventive concept may be substantially the same within the third sensing region SA3. Each of the second to eighth lines of the third trace lines RL3 may extend from a corresponding contact part to a position, which is parallel to the first contact part adjacent to the upper end of the third sensing region SA3, in the second direction DR2. Accordingly, a length difference between the third trace lines RL3 may be minimized.

That is, the second sensing signal lines RL may not extend from the lower end of the sensing region SA only to the position at which the contact part C0 is formed, and may further extend toward the upper end of the sensing region SA in an extension direction (e.g., the second direction DR2). Accordingly, a length difference between the second sensing signal lines RL connected to the second sensing electrodes RX1 to RX8 in the first to eighth rows may be minimized in the second direction DR2. Accordingly, a difference between parasitic capacitances formed from the second sensing signal lines RL by the length difference may be minimized, and the sensitivity according to a position may be constant within the sensing region SA. Thus, reliability of the sensor layer 200 may be improved.

Meanwhile, the positions of the contact parts C0 illustrated in FIG. 5A within the first to third sensing regions SA1 to SA3 are examples and may be changed. The position of each of the contact parts C0 is not limited to any one as long as each of the second sensing signal lines RL is connected to a corresponding split electrode of the second sensing electrode RX in a corresponding row. A sensor layer 200 in FIG. 5B is different from the sensor layer 200 illustrated in FIG. 5A in terms of the positions of the contact parts C0, and includes the substantially the same components. Hereinafter, the contact parts C0 will be described with a focus on a position difference.

Referring to FIG. 5B, first to eighth lines RL1-1 to RL1-8 of first trace lines RL1 may be connected to first split electrodes RX-1 of second sensing electrodes RX1 to RX8 in first to eighth rows through of first to eighth contact parts C1 to C8, respectively, within a first sensing region SA1.

The first contact part C1 may overlap a second sensing pattern SP2, which is located at a central portion of the first sensing region SA1, among the second sensing patterns SP2 that constitute the first split electrode RX-1 of the second sensing electrode RX1 in the first row.

Based on the first line RL1-1 connected to the first contact part C1, lines connected to the second sensing electrodes in odd rows and lines connected to the second sensing electrodes in even rows in the first direction DR1 may be arranged in directions opposing each other. For example, the third, fifth, and seventh lines RL1-3, RL1-5 and RL1-7, which are connected to the first split electrodes RX-1 of the second sensing electrodes RX3, RX5 and RX7 in the third, fifth, and seventh rows, respectively, may be located at a left side of the first line RL1-1. The second, fourth, sixth and eighth lines RL1-2, RL1-4, RL1-6 and RL1-8, which are connected to the first split electrodes RX-1 of the second sensing electrodes RX2, RX4, RX6 and RX8 in the second, fourth, sixth and eighth rows, respectively, may be located at a right side of the first line RL1-1.

For example, the third, fifth, and seventh lines RL1-3, RL1-5 and RL1-7 may be arranged in sequence at the left side of the first line RL1-1 in the first direction DR1. The third, fifth, and seventh contact parts C3, C5 and C7 that overlap the third, fifth, and seventh lines RL1-3, RL1-5 and RL1-7, respectively, may be located on the left based on the first contact part C1 in the first direction DR1.

The second, fourth, sixth and eighth lines RL1-2, RL1-4, RL1-6 and RL1-8 may be arranged in sequence at the right side of the first line RL1-1 in the first direction DR1. The second, fourth, sixth and eighth contact parts C2, C4, C6 and C8 that overlap the second, fourth, sixth and eighth lines RL1-2, RL1-4, RL1-6 and RL1-8, respectively, may be located on the right based on the first contact part C1 in the first direction DR1.

First to eighth lines of the second trace lines RL2 may be connected to the second split electrodes RX-2 of the second sensing electrodes RX1 to RX8 in the first to eighth rows through first to eighth contact parts, respectively, within a second sensing region SA2. The first line of the second trace lines RL2 may be connected to the second split electrode RX-2 of the second sensing electrode RX1 in the first row through the first contact part. The first contact part may overlap the second sensing pattern SP2 located at a central portion of the second sensing region SA2, among the second sensing patterns SP2 that constitute the second split electrode RX-2 of the second sensing electrode RX1 in the first row.

The third, fifth, and seventh lines of the second trace lines RL2, which are connected to the second split electrodes RX-2 of the second sensing electrodes RX3, RX5 and RX7 in the third, fifth, and seventh rows, respectively, may be located at the right side of the first line in the first direction DR1. The second, fourth, sixth and eighth lines of the second trace lines RL2, which are connected to the second split electrodes RX-2 of the second sensing electrodes RX2, RX4, RX6 and RX8 in the second, fourth, sixth and eighth rows, respectively, may be located at the left side of the first line.

The description of the first trace lines RL1 based on the first sensing region SA1 may also apply to the third trace lines RL3 within a third sensing region SA3. First to eighth lines of the third trace lines RL3 may be connected to third split electrodes RX-3 of the second sensing electrodes RX1 to RX8 in the first to eighth rows through first to eighth contact parts, respectively, within the third sensing region SA3.

The third, fifth, and seventh lines of the third trace lines RL3, which are connected to the third split electrodes RX-3 of the second sensing electrodes RX3, RX5 and RX7 in the third, fifth, and seventh rows, respectively, may be located at the left side of the first line in the first direction DR1. The second, fourth, sixth and eighth lines of the third trace lines RL3, which are connected to the third split electrodes RX-3 of the second sensing electrodes RX2, RX4, RX6 and RX8 in the second, fourth, sixth and eighth rows, respectively, may be located at the right side of the first line.

The position of each of the contact parts C0 within the first to third sensing regions SA1 to SA3 of the sensor layer 200 in FIG. 5B is an example, and is not limited to any one as long as each of the second sensing signal lines RL is connected to a corresponding split electrode of the second sensing electrode RX in a corresponding row.

Referring to FIG. 5C, among the second sensing signal lines RL, only some lines in regions, which are greatly affected by a difference in parasitic capacitances caused by a length difference, may each further extend toward the upper end of the sensing region SA from a position at which the contact part C0 is formed, and each of the remaining lines may extend only to the position at which the contact part C0 is formed.

Within the sensing region SA, the second sensing signal lines RL, which are connected to the second sensing electrode RX in a row arranged to be adjacent to first sensor pads PD1, may have a relatively small change in parasitic capacitances. Accordingly, each of the second sensing signal lines RL, which are connected to the second sensing electrode RX in the row arranged to be adjacent to the first sensor pads PD1, may extend only to the position at which the contact part C0 is formed. For example, the eighth line RL1-8, which is connected to the first split electrode RX-1 of the second sensing electrode RX8 in the eighth row arranged to be most adjacent to the first sensor pads PD1 within the first sensing region SA1, may extend from the first sensor pad PD1 to the eighth contact part C8. The seventh line RL1-7, which is connected to the first split electrode RX-1 of the second sensing electrode RX7 in the seventh row arranged to be relatively adjacent to the first sensor pads PD1 within the first sensing region SA1, may also extend from the first sensor pad PD1 to the seventh contact part C7.

Each of the first to sixth lines RL1-1 to RL1-6, which are connected to the first split electrodes RX-1 of the second sensing electrodes RX1 to RX6 in the first to sixth rows, respectively, may further extend toward the upper end of the first sensing region SA1 from a corresponding contact part (e.g., the first to sixth contact parts C1 to C6). Accordingly, a length difference between the first to sixth lines RL1-1 to RL1-6, which are greatly affected by a difference in parasitic capacitances, and the difference in parasitic capacitances may be minimized.

Although the first trace lines RL1 are described based on the first sensing region SA1, the description may also apply to the second trace lines RL2 within the second sensing region SA2 and the third trace lines RL3 within the third sensing region SA3.

Each of the seventh line and the eighth line of the second trace lines RL2, which are connected to the second split electrodes RX-2 of the second sensing electrodes RX7 and RX8 in the seventh and eighth rows arranged to be relatively adjacent to the second sensor pads PD2 within the second sensing region SA2, respectively, may extend to a corresponding contact part (e.g., the seventh contact part or eighth contact part). Each of the first to sixth lines of the second trace lines RL2, which are connected to the second split electrodes RX-2 of the second sensing electrodes RX1 to RX6 in the first to sixth rows, respectively, may further extend toward an upper end of the second sensing region SA2 from a corresponding contact part (e.g., the first to sixth contact parts). Accordingly, a length difference between lines of the second trace lines RL2, which are relatively prone to be affected by a difference in parasitic capacitances, and the difference in parasitic capacitances may be minimized.

Each of the seventh line and the eighth line of the third trace lines RL3, which are connected to the third split electrodes RX-3 of the second sensing electrodes RX7 and RX8 in the seventh and eighth rows arranged to be relatively adjacent to the third sensor pads PD3 within the third sensing region SA3, respectively, may extend to a corresponding contact part (e.g., the seventh contact part and the eighth contact part). Each of the first to sixth lines of the third trace lines RL3, which are connected to the third split electrodes RX-3 of the second sensing electrodes RX1 to RX6 in the first to sixth rows, respectively, may further extend toward an upper end of the third sensing region SA3 from a corresponding contact part (e.g., the first to sixth contact parts). Accordingly, a length difference between lines of the third trace lines RL3, which are relatively prone to be affected by a difference in parasitic capacitances, and the difference in parasitic capacitances may be minimized.

Meanwhile, embodiments illustrated in FIG. 5C are merely illustrative, and the number of the lines of the second sensing signal lines RL, which extend only to the position of the contact part C0, is not limited thereto.

Figure 6A:
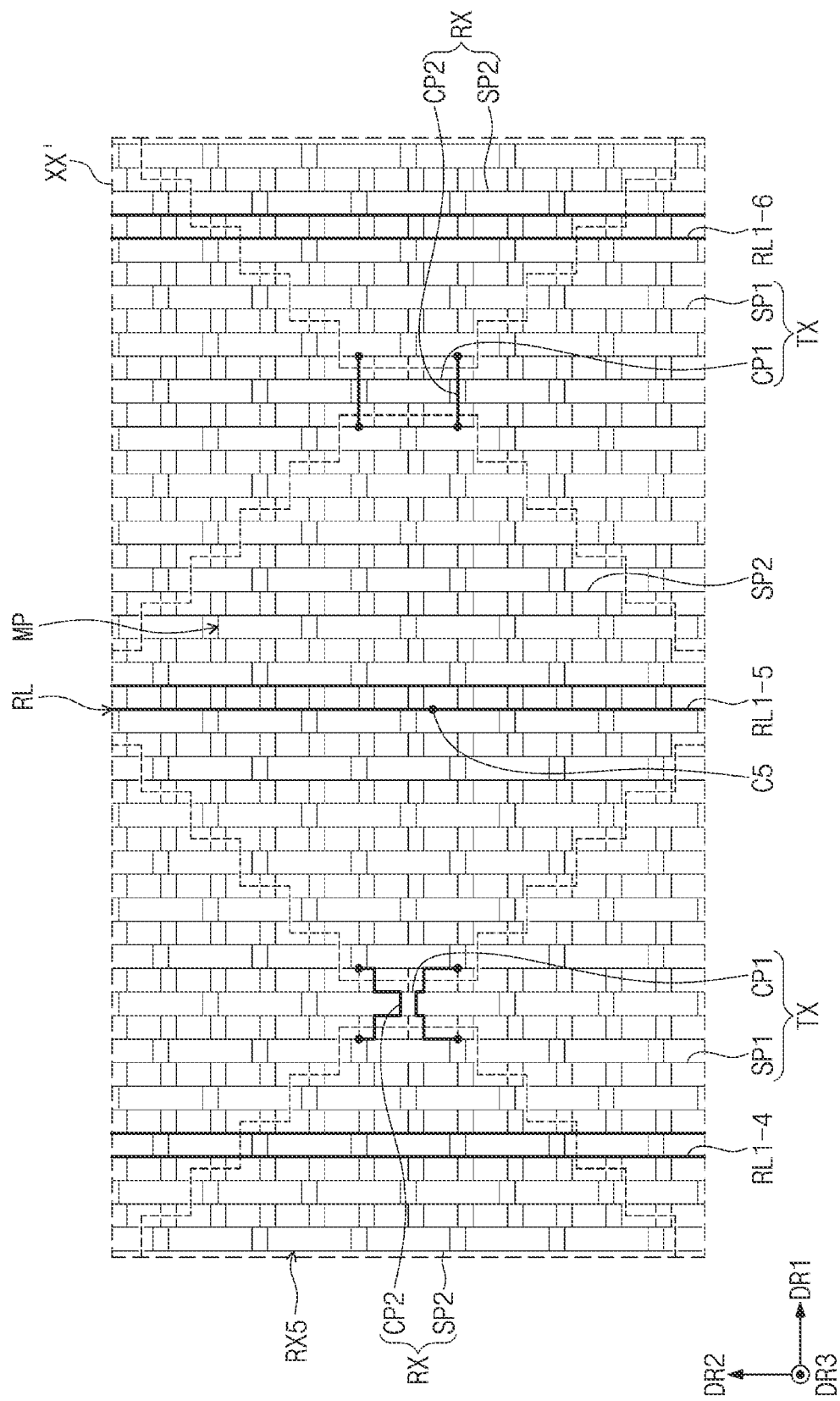
FIG. 6A is an enlarged plan view illustrating an area XX' illustrated in FIG. 5A.
Figure 6B:
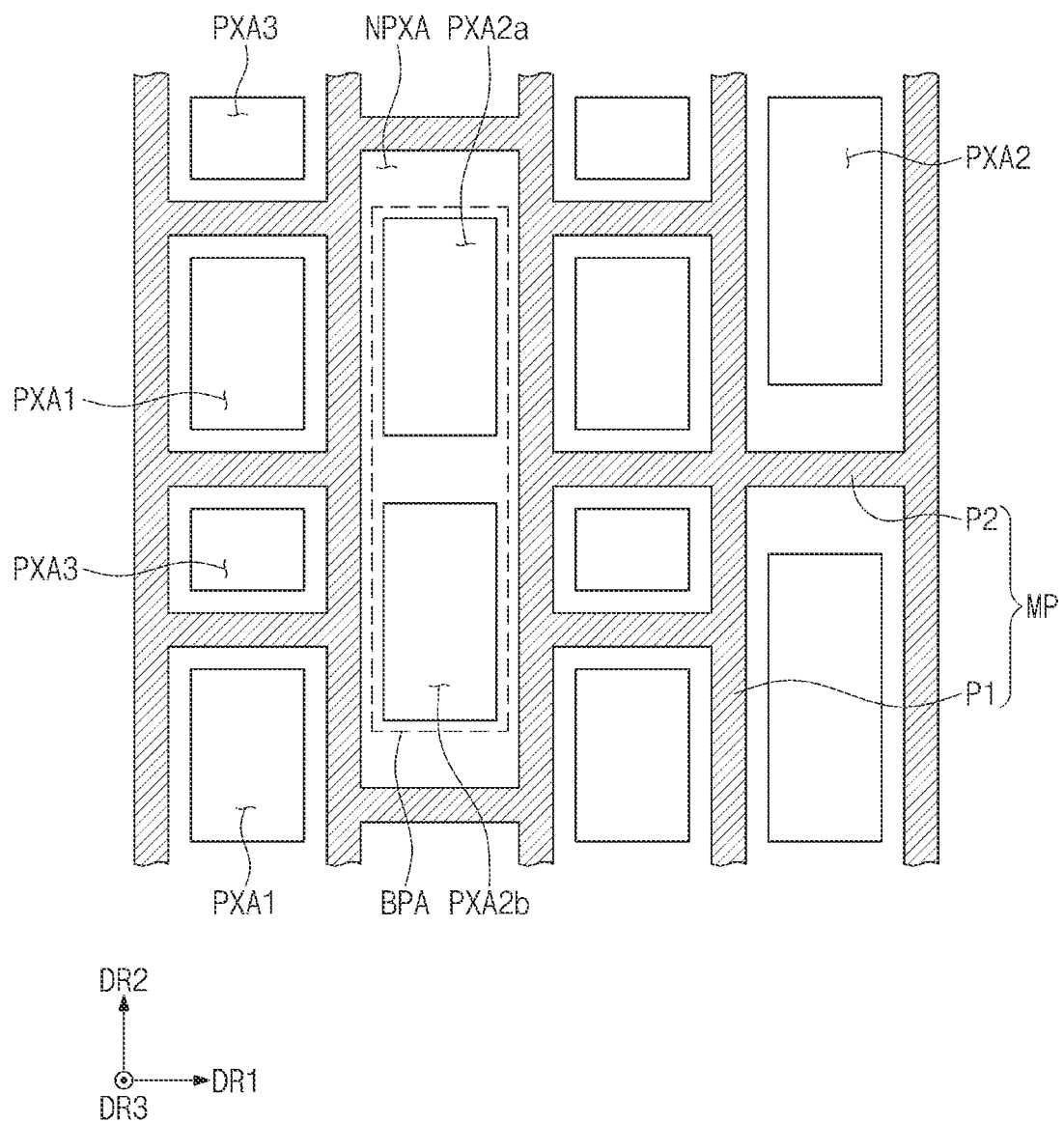
FIG. 6B is an enlarged plan view illustrating a portion of a sensing pattern illustrated in FIG. 6A.

FIG. 6A is an enlarged plan view illustrating an area XX' illustrated in FIG. 5A. FIG. 6B is an enlarged plan view illustrating a portion of a sensing pattern illustrated in FIG. 6A. The foregoing description may apply to respective components illustrated in FIGS. 6A and 6B.

Referring to FIGS. 6A and 6B, first sensing patterns SP1, first connection patterns CP1, and second sensing patterns SP2 may be located on the same layer. The second connection patterns CP2 may be located on a different layer from the second sensing patterns SP2 to be connected to overlapping second sensing patterns SP2 through a contact hole.

Second sensing signal lines RL may be located on a different layer from the second sensing patterns SP2. Each of the second sensing signal lines RL may overlap the second sensing pattern SP2 of a corresponding second sensing electrode RX and be connected through the contact part.

The first sensing patterns SP1, the first connection patterns CP1, and the second sensing patterns SP2 may include a mesh pattern MP that defines mesh opening portions. The mesh opening portions may overlap the emission regions PXA1 to PXA3 of the display layer 100 (see FIG. 4). That is, the mesh pattern MP of the first sensing patterns SP1, the first connection patterns CP1, and the second sensing patterns SP2 may not overlap the emission regions PXA1 to PXA3. As the emission regions PXA1 to PXA3 are located in the mesh opening portions of the mesh pattern MP, respectively, efficiency of light emitted through the emission regions PXA1 to PXA3 may not decrease.

The display layer 100 (see FIG. 4) may include a first emission region PXA1, a second emission region PXA2, and a third emission region PXA3. The description of the emission region PXA in FIG. 4 may apply to the first to third emission regions PXA1 to PXA3.

The first to third emission regions PXA1 to PXA3 may be divided according to colors of the light output through the emission regions. The first emission region PXA1 may output light having a first color, the second emission region PXA2 may output light having a second color, and the third emission region PXA3 may output light having a third color. The light having the first to third colors may be light having different colors. For example, the light having the first color may be green light, the light having the second color may be blue light, and the light having the third color may be red light. However, embodiments according to the present disclosure are not necessarily limited thereto.

An area of each of the first to third emission regions PXA1 to PXA3 may be variously designed according to a color of the output light, a resolution of the display layer 100 (see FIG. 4), and the like. For example, the areas of the first to third emission regions PXA1 to PXA3 may be different from each other. Among the first to third emission regions PXA1 to PXA3, the second emission region PXA2 may have the largest area, and the third emission region PXA3 may have the smallest area.

Each of the first emission region PXA1 and the second emission region PXA2 may extend in the second direction DR2. Each of the first emission region PXA1 and the second emission region PXA2 may have long sides extending in the second direction DR2. The second emission region PXA2 may have a length that is greater than a length of the first emission region PXA1 in the second direction DR2.

The third emission region PXA3 may have long sides extending in the first direction DR1. The third emission region PXA3 may have a length that is less than the length of each of the first emission region PXA1 and the second emission region PXA2 in the second direction DR2.

Each of the first to third emission regions PXA1 to PXA3 may be provided in plurality. The first emission regions PXA1 and the third emission regions PXA3 may be alternately arranged in the second direction DR2 and form a first column. The second emission regions PXA2 may be arranged in the second direction DR2 and form a second column. The first column and the second column may be alternately arranged in the first direction DR1. Each of the second emission regions PXA2 may overlap at least a portion of the first emission region PXA1 and the third emission region PXA3 in the first direction DR1.

Two second emission regions PXA2a and PXA2b of the second emission regions PXA2, which are adjacent to each other in the second direction DR2, may be defined as an emission group BPA. The second emission regions PXA2a and PXA2b in one emission group BPA may overlap an emission layer having an integral shape. Accordingly, an area of each the second emission regions PXA2a and PXA2b may be prevented from being insufficiently formed during a process. However, embodiments according to the present disclosure are not necessarily limited thereto.

A non-emission region NPXA may surround the first to third emission regions PXA1 to PXA3. The non-emission region NPXA may set a boundary of each of the first to third emission regions PXA1 to PXA3. Accordingly, the non-emission region NPXA may prevent mixture of colors between the first to third emission regions PXA1 to PXA3.

The mesh pattern MP may include a first line portion P1 and a second line portion P2. The first line portion P1 and the second line portion P2 may have an integral shape, and may define the mesh opening portions that overlap the first to third emission regions PXA1 to PXA3, respectively. The first and second line portions P1 and P2 of the mesh pattern MP may have a shape surrounding the first to third emission regions PXA1 to PXA3 in a plan view. That is, the first and second line portions P1 and P2 of the mesh pattern MP may not overlap the first to third emission regions PXA1 to PXA3 and may overlap the non-emission region NPXA.

Each of the mesh opening portions of the mesh pattern MP may have a size that is greater than a size of an overlapping emission region. Accordingly, light emitting efficiency of the emission regions PXA1 to PXA3 may be prevented from being decreased by the mesh pattern MP.

The first line portion P1 may correspond to a portion of the mesh pattern MP, which extends in the second direction DR2. The first line portion P1 may be located between each of the first and third emission regions PXA1 and PXA3 and each of the second emission regions PXA2, which are adjacent to each other in the first direction DR1. That is, the first line portion P1 may be located between the first column and the second column that are described above.

The second line portion P2 may correspond to a portion of the mesh pattern MP, which extends in the first direction DR1. The second line portion P2 may extend from the first line portion P1 in the first direction DR1. The second line portion P2 may be located between the first emission region PXA1 and the third emission region PXA3, which are adjacent to each other in the second direction DR2, or may be located between the emission groups BPA. The second line portion P2 may not be located between the second emission regions PXA2a and PXA2b that constitute one emission group BPA. However, embodiments according to the present disclosure are not necessarily limited thereto.

Meanwhile, the shape of the mesh pattern MP illustrated in FIGS. 6A and 6B is an example, and the shape of the mesh pattern MP may be variously changed according to the areas and arrangement of the emission regions PXA1 to PXA3.

The sensor layer 200 according to some embodiments of the present disclosure may include a sensing region SA extending in one direction, and may include sensing electrodes (e.g., second sensing electrodes RX) extending in the one direction. The second sensing electrodes RX may be arranged in a direction crossing the extension direction to form a plurality of rows (e.g., second sensing electrodes RX1 to RX8 in first to eighth rows). Second sensing signal lines RL may overlap within the sensing region SA and be connected to the second sensing electrodes RX in the plurality of rows, respectively. The second sensing signal lines RL may not extend from a lower end of the sensing region SA only to a position, at which a contact part C0 is formed, and may further extend toward an upper end of the sensing region SA. Accordingly, a length difference between the second sensing signal lines RL connected to the second sensing electrodes RX in the plurality of rows may be minimized, and a difference in sensitivity according to a position may be minimized. Thus, reliability of the sensor layer 200 may be improved.

Each of sensing signal lines according to some embodiments of the present disclosure may be connected to a sensing electrode through a contact part located within a sensing region. At least some of the sensing signal lines may further extend through the contact part in an extension direction, and accordingly, a length difference between the sensing signal lines may be minimized or reduced. As a result, a different between parasitic capacitances according to the position may be minimized or reduced to improve reliability of a sensor layer and an electronic apparatus.

Although aspects of some embodiments of the present invention have been described, it is understood that the present invention should not be limited to these embodiments but various changes and modifications can be made by one ordinary skilled in the art within the spirit and scope of the present invention as hereinafter claimed.

Therefore, the technical scope of embodiments according to the present disclosure are not limited to the contents described in the detailed description of the specification, but should be determined by the appended claims, and their equivalents.

What is claimed is:

1. An electronic apparatus comprising:
   a display layer configured to display images; and
   a sensor layer on the display layer and comprising a sensing region and a non-sensing region;
   wherein the sensor layer comprises:
   first sensing electrodes arranged in a first direction and extending on the sensing region in a second direction crossing the first direction;
   second sensing electrodes arranged in the second direction and extending on the sensing region in the first direction;
   first sensing signal lines connected to ends of the first sensing electrodes, respectively; and
   second sensing signal lines connected to the second sensing electrodes respectively, through a contact part overlapping the sensing region, and extending to overlap a plurality of the second sensing electrodes in the sensing region,
   wherein
   the second sensing signal lines have a same length in the sensing region, wherein the first sensing electrodes comprise:
   first sensing patterns arranged in the second direction;
   first connection patterns on a same layer from the first sensing patterns to connect the first sensing patterns, which are adjacent to each other in the second direction, to each other; and
   the second sensing electrodes comprise second sensing patterns arranged in the first direction, and first connection patterns on a different layer from the second sensing patterns to connect the second sensing patterns, which are adjacent to each other in the first direction, to each other.

2. The electronic apparatus of claim 1, wherein the second sensing signal lines extend in the second direction and are arranged in the first direction within the sensing region.

3. The electronic apparatus of claim 1, wherein the sensing region has a length in the first direction, which is greater than a length in the second direction.

4. The electronic apparatus of claim 3, wherein the sensing region comprises first to third sensing regions arranged in the first direction, and
   each of the second sensing electrodes comprises first to third split electrodes in the first to third sensing regions, respectively,
   wherein the first to third split electrodes that constitute one second sensing electrode are sensed at a same time.

5. The electronic apparatus of claim 4, wherein the second sensing signal lines comprise:
   first trace lines on the first sensing region and connected to the first split electrodes, respectively;
   second trace lines on the second sensing region and connected to the second split electrodes, respectively; and
   third trace lines on the third sensing region and connected to the third split electrodes, respectively.

6. The electronic apparatus of claim 5, wherein the first split electrodes are arranged on the first sensing region in the second direction, and
   the first trace lines are connected to the first split electrodes of the second sensing electrodes through contact parts overlapping the first sensing region, respectively,
   wherein the contact parts overlapping the first trace lines are different in position in the second direction.

7. The electronic apparatus of claim 6, wherein each of at least some of the first trace lines extends toward an upper end of the first sensing region through an overlapping contact part among the contact parts in a plan view.

8. The electronic apparatus of claim 7, wherein the first trace lines have a same length on the first sensing region.

9. The electronic apparatus of claim 1, wherein each of the second sensing signal lines is connected to a corresponding second sensing electrode through the contact part, and
   the contact part overlaps one of the second sensing patterns of the corresponding second sensing electrode.

10. The electronic apparatus of claim 1, wherein the display layer comprises a plurality of emission regions configured to emit light having different colors, and
    wherein the first sensing patterns and the second sensing patterns comprise a mesh pattern non-overlapping the plurality of emission regions.

11. The electronic apparatus of claim 10, wherein the plurality of emission regions comprise first to third emission regions configured to emit light having first to third colors, respectively,
    wherein the first to third emission regions have different areas.

12. The electronic apparatus of claim 11, wherein an area of the first emission region is less than an area of the second emission region, and the light having the first color has a wavelength that is greater than a wavelength of the light having the second color.

13. The electronic apparatus of claim 1, wherein the sensor layer further comprises second sensing signal lines connected to ends of the second sensing electrodes, respectively.

14. The electronic apparatus of claim 1, wherein the display layer comprises:
- a base layer;
- a light emitting element on the base layer; and
- an encapsulation layer configured to seal the light emitting element,
- wherein the sensor layer is in contact with the encapsulation layer.

15. A sensor layer comprising:
- a sensor base layer comprising a sensing region having a long side extending a first direction and having a short side extending in a second direction crossing the first direction;
- first sensing electrodes in first to m-th columns, which are arranged on the sensing region in the first direction;
- second sensing electrodes in first to n-th rows, which are arranged on the sensing region in the second direction;
- first sensing signal lines connected to ends of the first sensing electrodes in the first to m-th columns;
- second sensing signal lines connected to the second sensing electrodes in the first to n-th rows through first to n-th contact parts overlapping the second sensing electrodes in the first to n-th rows, respectively;
- sensor pads adjacent to the second sensing electrode in the n-th row,
- wherein each of the n and the m is a natural number of 2 or more, and
  - each of at least two of the second sensing signal lines extends from the sensor pads toward an upper end of the sensing region adjacent to the first row in the second direction passing through an overlapping contact part among the first to n-th contact parts,
- wherein each of the first sensing electrodes in the first to m-th columns comprises:
  - first sensing patterns arranged in the second direction; and
  - first connection patterns on a same layer from the first sensing patterns to connect the first sensing patterns, which are adjacent to each other in the second direction, to each other; and
- each of the second sensing electrodes in the first to n-th rows comprises first sensing patterns arranged in the first direction, and first connection patterns on a different layer from the second sensing patterns to connect the second sensing patterns, which are adjacent to each other in the first direction, to each other.

16. The sensor layer of claim 15, wherein the second sensing signal lines extend on the sensing region in the second direction, and
- the second sensing signal lines overlapping the sensing region have a same length.

17. The sensor layer of claim 15, wherein the sensing region comprises first to k-th sensing regions arranged in the first direction,
- each of the second sensing electrodes in the first to n-th rows comprises first to k-th split electrodes that are in the first to k-th sensing regions, respectively, and
- the second sensing signal lines comprise first to k-th trace lines that are on the first to k-th sensing regions to be connected to the first to k-th split electrodes, respectively, and
- wherein the k is a natural number of 2 or more.

18. The sensor layer of claim 17, wherein the first to k-th trace lines have a same length on the first sensing region.

* * * * *